(12) United States Patent
Nishigaki et al.

(10) Patent No.: US 7,439,971 B2
(45) Date of Patent: Oct. 21, 2008

(54) MESH GENERATION METHOD FOR NUMERICAL SIMULATION

(75) Inventors: Ichiro Nishigaki, Ishioka (JP); Noriyuki Sadaoka, Tokai (JP); Tatsuro Yashiki, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 11/435,880

(22) Filed: May 18, 2006

(65) Prior Publication Data

US 2007/0120849 A1    May 31, 2007

(30) Foreign Application Priority Data

May 20, 2005    (JP)    ............... 2005-147601

(51) Int. Cl.
*G06T 15/00*    (2006.01)
(52) U.S. Cl. .................. 345/419; 345/420; 345/423; 345/428
(58) Field of Classification Search ......... 345/419–420, 345/423, 428
See application file for complete search history.

(56) References Cited

U.S. PATENT DOCUMENTS

| | | | | |
|---|---|---|---|---|
| 5,963,209 | A * | 10/1999 | Hoppe | 345/419 |
| 6,198,486 | B1 * | 3/2001 | Junkins et al. | 345/419 |
| 6,262,739 | B1 * | 7/2001 | Migdal et al. | 345/423 |
| 6,515,660 | B1 * | 2/2003 | Marshall et al. | 345/420 |
| 6,587,104 | B1 * | 7/2003 | Hoppe | 345/423 |
| 6,982,715 | B2 * | 1/2006 | Isenburg | 345/428 |
| 7,224,356 | B2 * | 5/2007 | Zhou et al. | 345/419 |
| 7,283,134 | B2 * | 10/2007 | Hoppe | 345/423 |

FOREIGN PATENT DOCUMENTS

| | | |
|---|---|---|
| JP | 11-096399 | 4/1999 |
| JP | 11-110587 | 4/1999 |
| JP | 2000-331058 | 11/2000 |
| JP | 2002-318823 | 10/2002 |
| JP | 2005-038219 | 2/2005 |

OTHER PUBLICATIONS

Yang et al., Optimized Mesh and Texture Multiplexing for Progressive Textured Model Transmission, MM'04, Oct. 10, 2004, pp. 676-683.*

Khodakovsky et al., Progressive Geometry Compression, ACM Press- SIGGRAPH'00, Jul. 2000, pp. 271-278.*

* cited by examiner

*Primary Examiner*—Phu K Nguyen
(74) *Attorney, Agent, or Firm*—Antonelli, Terry, Stout & Kraus, LLP.

(57) ABSTRACT

A mesh generating method for numerical simulation of one (1) piece of an analysis target, in a short time period, where there are plural numbers of high-density configuration data, each presenting a configuration surface thereof said one (1) piece of analysis target, including the performing of a plurality of sub-steps until when none of the plural numbers of configuration mesh data remains, and mesh data for numerical simulation is generated from the final combined low-density configuration mesh data.

5 Claims, 11 Drawing Sheets

MESH GENERATION METHOD FOR NUMERICAL SIMULATION

BACKGROUND OF THE INVENTION

The present invention relates to a CAE (Computer Aided Engineering) for automating and optimizing design works, through numerical analytic simulation with using a computer, and in particular, it relates to a technology for generating mesh data for use in analyzing (i.e., mesh for numerical simulation) from configuration data, which is obtained about a target to be analyzed or simulated (i.e., an analysis or simulation target), through a three-dimensional configuration measuring apparatus.

In a field of the CAE, there is already known a technology of conducting an analytic simulation, through obtaining the configuration data relating to the configuration surface of the analysis target, thereby generating the mesh for numerical simulation from that configuration data. This technology is high in availability, in particular, from a viewpoint that it enables an analytic simulation about an actual target as it is. Upon such analyzing, it is common that the configuration mesh data is generated in the form of triangle mesh data, from the configuration data of the analysis target, which can be obtained through measurement by means of the three-dimensional configuration measuring apparatus, and that from that configuration data is generated the mesh for numerical simulation in the form of a tetrahedral mesh data.

As a method for generating the tetrahedral mesh data within an inside of the configuration of the analysis target, in the form of the mesh for numerical simulation thereof, from the triangle mesh data, being the configuration mesh data for presenting configuration surface of the analysis target, there are already known the Deloni's dividing method and the Yagi's dividing method, etc. In the Deloni dividing method, first of all rough tetrahedral mesh data is generated from the triangle mesh data of the configuration surface, and then the rough tetrahedral mesh data is fragmentized through sequentially adding points within an inside of the configuration; thereby generating the tetrahedral mesh data of high quality for use in the numerical simulation thereof (see for example the following Patent Documents 1 and 2). On the other hand, the Yagi's dividing method is a method of obtaining the mesh data within an inside of the configuration, though cutting orthogonal gratings (i.e., hexahedron gratings) by the triangle mesh of the configuration surface, while setting up the orthogonal gratings to include the triangle mesh data of the configuration surface therein; i.e., in particular, the tetrahedron within an inside of the configuration is divided into a plural number of tetrahedrons, so as to generate the tetrahedral mesh data (see for example the following Patent Document 3).

Also, when generating the mesh for numerical simulation from the configuration data, there are many cases where it is necessary to generate one (1) piece of the mesh for numerical simulation, with using a plural number of pieces of configuration mesh data. Thus, in cases where the analysis target is large in the sizes and/or complex in the structures thereof, or in case when trying to obtain the configuration data at much higher accuracy thereof, it is necessary to pick up pictures of the analysis target, while dividing it into plural numbers of areas thereof, when obtaining the configuration data at the accuracy that is needed by picking up an image of the analysis target through an X-ray CT apparatus, for example. In such cases, plural pieces of configuration mesh data are obtained for one (1) piece of the analysis target, and there is necessity of a process for combining or unifying each of respective configuration mesh data, so as to generate one (1) piece of the mesh for numerical simulation (i.e., analysis use mesh data) from those plural pieces of the configuration mesh data.

For generating one (1) piece of the mesh data through combining or unifying the plural pieces of the mesh data, there is already known a method of moving the joints at connection portions of the mesh data, thereby to connect them, or a method of dividing a ridgeline on the mesh data to be connected so that the joint positions can be commonly shared with each other, thereby to connect them (for example, in the following Patent Document 4). Further, there is also known a method of designating the relative positions of the mesh data, thereby to connect the mesh data with each other (for example, in the following Patent Document 5).

Patent Document 1: Japanese Patent Laying-Open No. Hei 11-110587 (1999);

Patent Document 2: Japanese Patent Laying-Open No. Hei 11-96399 (1999);

Patent Document 3: Japanese Patent Laying-Open No. 2005-38219 (2005);

Patent Document 4: Japanese Patent Laying-Open No. 2002-318823 (2002); and

Patent Document 5: Japanese Patent Laying-Open No. 2000-331058 (2000).

The three-dimensional configuration measuring apparatus of recent years, in particular, the X-ray CT apparatus is able to obtain the configuration data at high configuration accuracy thereof, and it makes an advance into high density of the configuration mesh data and an increase of the data volume thereof. Accompanying with such an increase of the data volume, it results into problems in processing capacity of the computer; i.e., that it takes an extensive amount of times in the process for generating the mesh for numerical simulation from the configuration mesh data, as well as, in the process for analyzing the mesh for numerical simulation thereof, and further that those processes go beyond the limit of capacity of the computer. And, such the problems of processing capacity comes to be further serious, in particular, when there are plural configuration mesh data for one (1) piece of the analysis target, and those are necessary to be processed in combination, as was mentioned above. Namely, if applying the conventional combining method, such as, of dividing the ridgeline and thereby combining the meshes divided, for example, into the combining processes, then the number of the meshes is further increased, and therefore, there may be a high possibility that the increasing data volume exceeds the limit of data volume, which the computer can deal with, and then the computer cannot process the combination of the configuration data.

About the problem of such processing capacity, it is possible to deal with, by reducing the number of meshes of the configuration data; i.e., a process of lowering the density thereof. However, with such the process of simply reducing the number of meshes; i.e., lowering the density thereof, on the contrary, but there is caused other problem, such as, that the configuration errors are increased on the mesh for numerical simulation, although applying the configuration data at high accuracy with much trouble therein, for example. Further, it is also possible to deal with such the problems of processing capacity, through a method of reducing the number of addition of the interior points within the Deloni's dividing method, or of enlarging the distance of the orthogonal grating in the Yagi's dividing method; however, in the similar manner, those methods also cause the problems, such as, the configuration errors on the mesh for numerical simulation and lowering the quality of the mesh for numerical simulation.

BRIEF SUMMARY OF THE INVENTION

According to the present invention, accomplished upon the basis of such situation as was mentioned above, an object thereof is to provided a mesh generating method for numerical simulation, for enabling to generate the mesh for numerical simulation at high accuracy, in a short time, by means of a general-purpose computer, such as, a personal computer, for example, when generating one (1) piece of the mesh for numerical simulation from plural number of the configuration mesh data, in particular when there are plural number of the configuration mesh data of that high density, i.e., under the condition of being large in the data volume for one (1) piece of the analysis target.

According to the present invention, for accomplishing the object mentioned above, there is provided a mesh generating method for numerical simulation, generating mesh data for numerical simulation of one (1) piece of an analysis target, where there are plural numbers of high-density configuration data, each presenting a configuration surface thereof said one (1) piece of analysis target, comprising the following steps: a step for reading one (1) piece of the configuration mesh data "A" from said plural numbers of the configuration mesh data; a step for generating low-density configuration mesh data "B" through treating a density lowering process for reducing a number of meshes on said configuration mesh data "A"; a step for reading configuration mesh data "C" neighboring to said configuration mesh data "A" from said plural numbers of configuration mesh data; a step for generating mixed and combined configuration mesh data "D" mixing a low density portion and a high density portion therein, through combining said low-density configuration mesh data "B" with said configuration mesh data "C"; and a step for generating combined low-density configuration mesh data "E" through treating a density lowering process for reducing a number of meshes on the high density portion of said mixed and combined configuration mesh data "D", wherein final combined low-density configuration mesh data is generated through repeating every said processes up to said process for generating the combined low-density configuration mesh data "E", until when none of said plural numbers of configuration mesh data remains, and mesh data for numerical simulation is generated from said final combined low-density configuration mesh data.

Also, according to the present invention, in the mesh generating method described in the above, said density lowering process is conducted under a predetermined standard of mesh quality.

Also, according to the present invention, in the mesh generating method described in the above, the combining of said configuration mesh data is conducted through generating common mesh at a common portion between said low-density configuration mesh data and said high-density configuration mesh data on targets to be combined.

Also, according to the present invention, in the mesh generating method described in the above, priority is given to the configuration of said high-density configuration mesh data when generating said common mesh data.

And, according to the present invention, in the mesh generating method described in the above, said low-density configuration mesh data can maintain a connecting line and/or a connection surface therewith.

Thus, according to the present invention mentioned above, the combined low-density configuration mesh data can be obtained through repeating the density lowering and combining, alternately, upon plural numbers of high-density configuration mesh data on one (1) piece of a analysis target, and the mesh data for numerical simulation is generated from that combined low-density configuration mesh data. Fort this reason, according to the present invention, the data volume to be treated with, during a series of processes, can be suppressed to be equal or less than a predetermined number, and therefore it can be treated with processing, even with the general-purpose computer, such as, a personal computer, for example, easily with a surplus, and also the processing time can be shorten with an increase of high efficiency of generating the mesh data for use of numerical simulation. Also, according to the present invention, since the combination of the each configuration mesh data is conducted by combining the high-density configuration mesh data, before the lowering of the density thereof, to the low-density configuration mesh data, therefore it is possible to maintain the accuracy of configuration in the connecting portion at the high accuracy of configuration on the high-density configuration mesh data, and also to prevent the mesh quality at the connecting portion from degrading; i.e., it is possible to generated the mesh data for numerical simulation at high accuracy.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Figure 1:
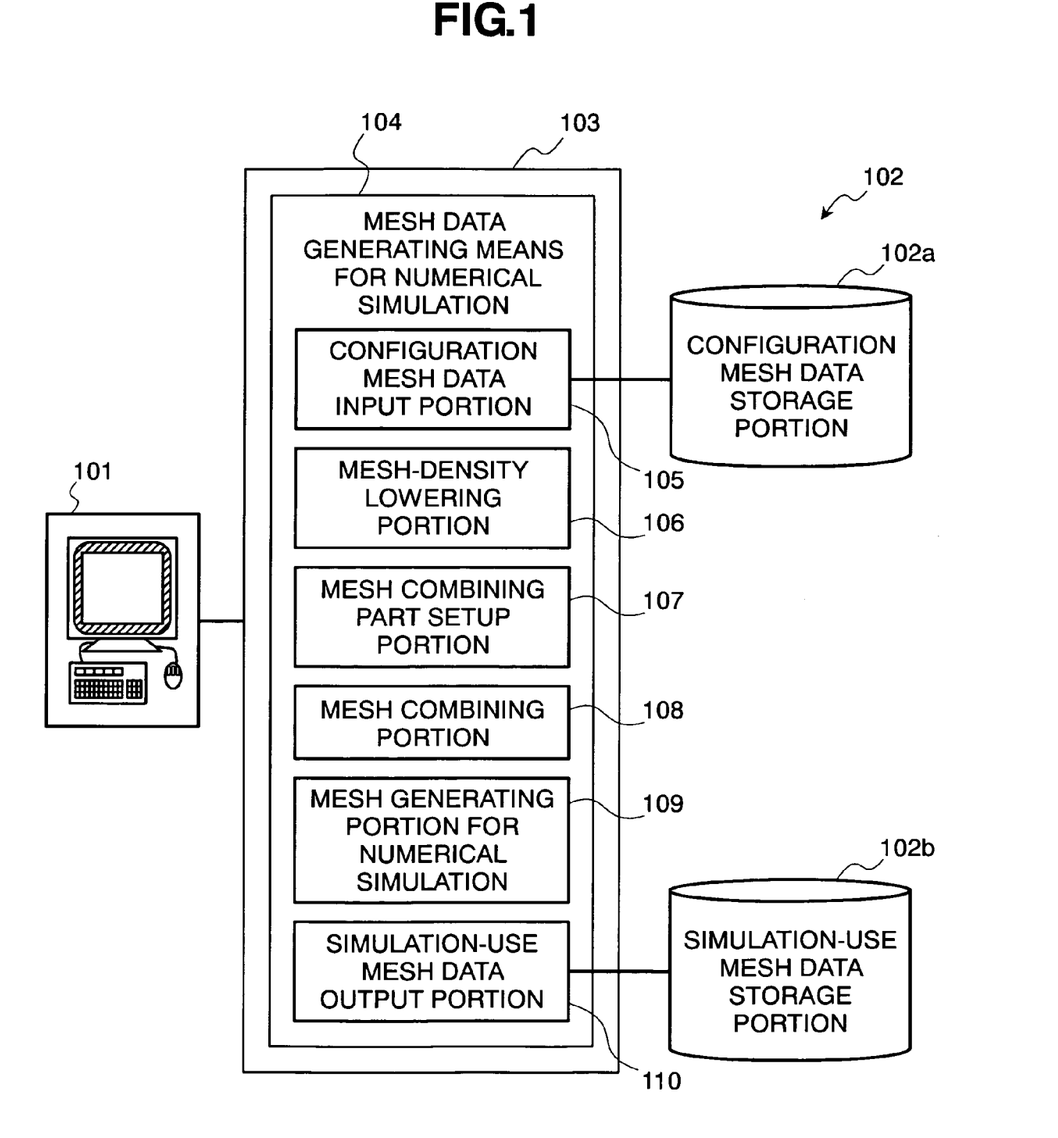
FIG. 1 is a view for showing the structures of a mesh generating system for numerical simulation, according to an embodiment of the present invention.

Hereinafter, an embodiment(s) according to the present invention will be explained by referring to the attached drawings. FIG. 1 shows the structures of a mesh generating system for numerical simulation, according to one example of the present invention. The mesh generating system for numerical simulation, according to the present embodiment, comprises an input/output device 101, a data storage device 102, and a data processing apparatus 103, as the hardware elements thereof.

The input/output device 101, being provided for a user of the system to input data therein and to output a result of processing thereof, includes an input device(s) being constructed with a keyboard and/or a mouse, for example, and an output device, such as, a display, etc.

Within the data storage device 102, there are provided a configuration mesh data storage portion 102a and an analysis or simulation-use mesh data storage portion 102b. Into the configuration mesh data storage portion 102a, there is stored the configuration mesh data for expressing the configuration surface of an analysis or simulation target, in more details thereof, the triangle mesh data of high density (i.e., high density triangle mesh data). And, into the configuration mesh data storage portion 102a, there is stored the simulation-use mesh data to be generated from the configuration data, in more details thereof, simulation-use tetrahedron mesh data.

Within the data processing apparatus 103 is installed an analysis or simulation-use mesh generating means 104 for executing a mesh generating process for numerical simulation of, as an element of software, in the form of a computer program. That simulation-use mesh generating means 104 includes various functional means, such as, a configuration mesh data input portion 105, a mesh-density lowering portion 106, a mesh combining position setup portion 107, a mesh combining portion 108, a mesh generating portion 109 for numerical simulation, and a mesh data output portion 110 for numerical simulation, etc.

The configuration mesh data input portion 105 allows the configuration data stored in the configuration mesh data storage portion 102a to be inputted. In more details, it reads out the configuration data from the configuration mesh data storage portion 102a, being inplural number thereof for one (1) piece of an object of analysis (i.e., the analysis or simulation target), for which the simulation-use mesh data should be generated, one by one, depending on processing of the processes thereof, in accordance with a predetermined order thereof, thereby to be inputted therein.

The mesh-density lowering portion 106 conducts a density lowering process (or, a resolution lowering process), i.e., converting the high-density mesh data into the low-density configuration data of, through reducing the number of meshes on the configuration data, which is inputted within the configuration mesh data input portion 105.

The mesh combining position setup portion 107 sets up a relative position for combining or connecting the neighboring plural number of configuration mesh data with each other, on one (1) piece of the analysis target, depending upon an assembling condition thereof.

The mesh combining portion 108 generates a combined or connected mesh data by combining or connecting the configuration mash data. In more details thereof, the combined mesh data is generated through combining or connecting the high-density configuration mesh data, which is inputted next, with the low-density configuration mesh data, which is generated through the density lowering process in the mesh-density lowering portion 106, under the setup of the relative position made by means of the mesh connecting position setup portion 107.

The numerical simulation mesh generating portion 109 generates the numerical simulation mesh data from the low-density combined configuration mesh data, which is generated through repetitive conductions of the density lowering process and the mesh combining process, within an inside of the configuration (i.e., a volume portion).

The mesh data output portion 110 outputs the numerical simulation mesh data, which is generated within the numerical simulation mesh generating portion 109, to the simulation-use mesh data storage portion 102b.

Herein, as the configuration mesh data, which can be deal with in the present mesh generating system for numerical simulation, there are included, not only the configuration mesh data, which can be generated from the configuration data, being obtainable through the three-dimensional configuration measuring apparatus, such as, the X-ray CT apparatus, for example, but also a configuration data, such as, triangle mesh data of high density (i.e., high-density triangle mesh data), which can be generated from the configuration data, being obtainable by finely dividing the configuration surface of a solid model produced through the three-dimensional CAD into triangles, or the high-density triangle mesh data, which can be obtained by dividing the mesh data for use of display, such as, STL data, to be used within the computer graphics, into fine triangles, for example. And, it is also possible to deal with those various kinds of configuration mesh data in combining or mixing therewith. Also, the present mesh generating system for numerical simulation can stop or interrupt the processing within each of the various functional portions mentioned above, and thereby re-starting that process in another day. However, in such the cases, the low-density mesh data and/or the combined mesh data, which are generated up to that time when it is in the interruption condition thereof, should be stored into the configuration mesh data storage portion 102a, temporarily.

Figure 2:
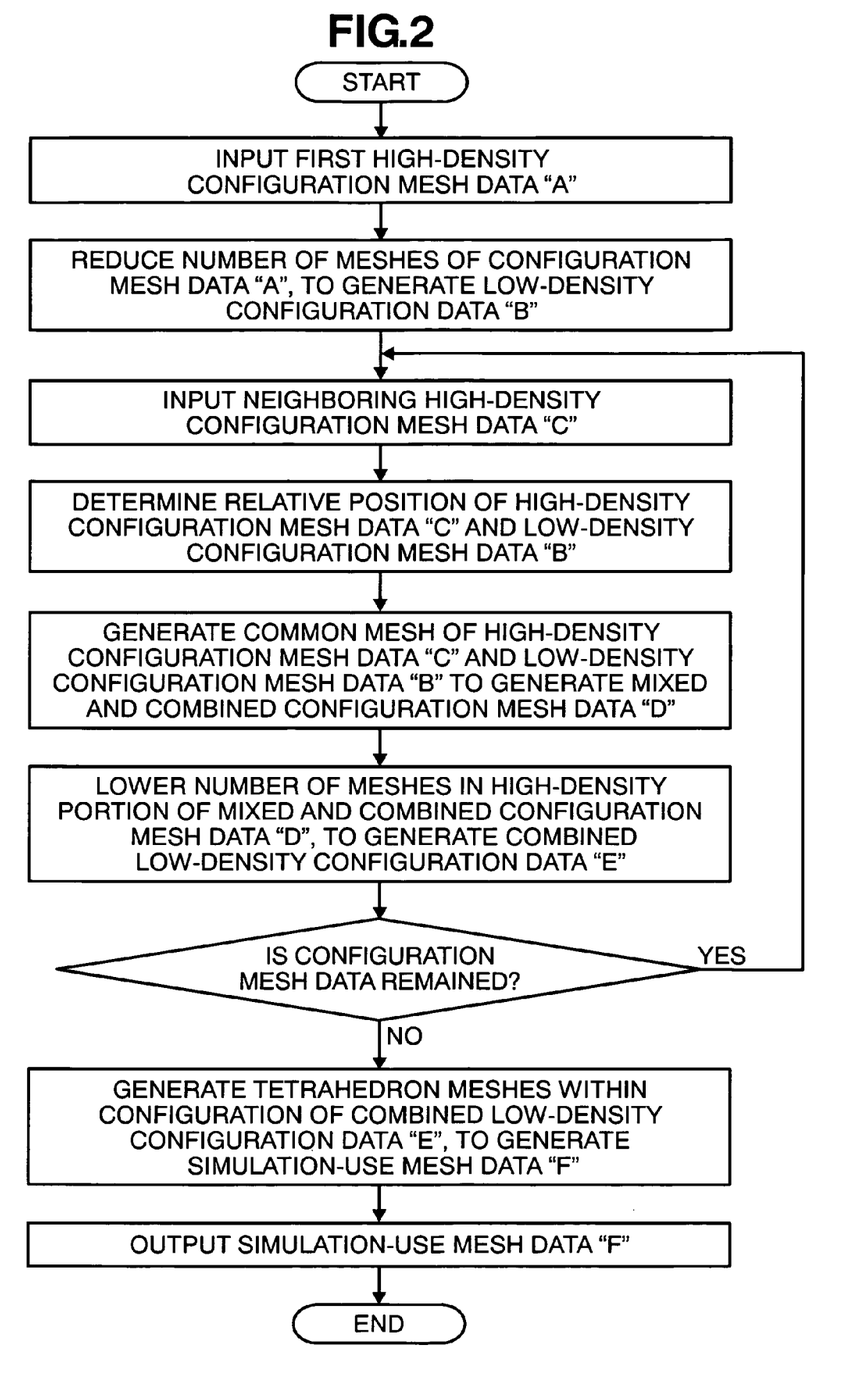
FIG. 2 is a view for showing a flow of processes in the mesh generating system for numerical simulation.
Figure 3:
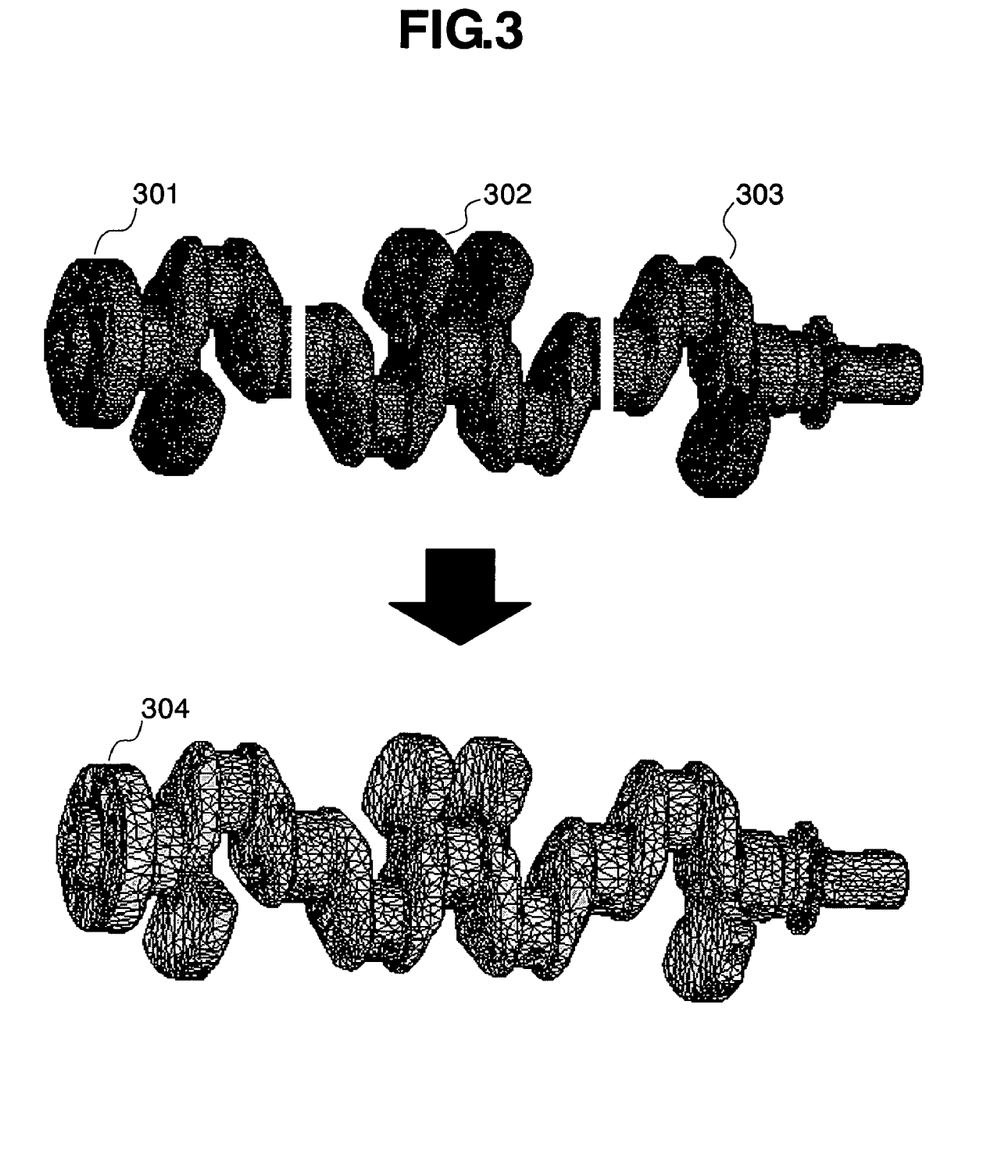
FIG. 3 is a view for showing an example of plural number of configuration mesh data and an example of low-density combined configuration mesh data.

Next, explanation will be made on the processes to be conducted within the present mesh generating system for numerical simulation. FIG. 2 shows a flow of processes within the present mesh generating system for numerical simulation. The explanation which will be given below is about a case where plural numbers of mesh data of high density (i.e., high-density triangle mesh data 301 through 303), as shown in an upper stage of FIG. 3, are stored into the configuration mesh data storage portion 102a, and for that analysis target is generated such combined low-density configuration mesh data 304, as is shown in a lower stage of FIG. 3; thereby, generating the mesh data for numerical simulation from that combined low-density configuration mesh data 304. The example shown in FIG. 3 is case where three (3) pieces of high-density triangle mesh data 301 to 303 are for one (1) piece of a crankshaft, to be in plural numbers of configuration mesh data thereof, obtained through picking up the image of the crankshaft while dividing it into three (3) areas or regions thereof. Herein, assuming that the number of meshes in each of those high-density triangle mesh data 301 to 303 is one million (1,000,000) facets, for example, that the number of meshes of the combined low-density configuration mesh data is thirty million (30,000,000) facets, for example, and that processing capacity of the data processing apparatus in the mesh generating system for numerical simulation comes up to eleven million (11,000,000) facets, for example.

When starring the generation process of the mesh data for simulation, firstly the configuration mesh data input portion 105 reads the first high-density triangle mesh data 301 (mesh data A in FIG. 2) therein, from the configuration mesh data storage portion 102a therein (a configuration mesh data inputting process 201).

Figure 4A:
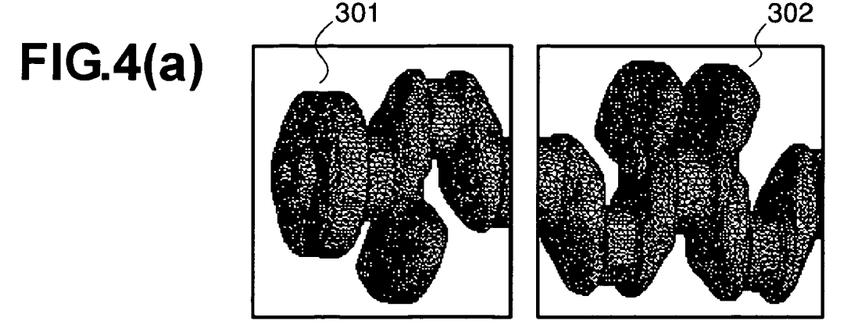
FIGS. 4(a) to 4(d) are views for showing conditions of advancements in lowering the density and also in combining the configuration data.
Figure 4B:
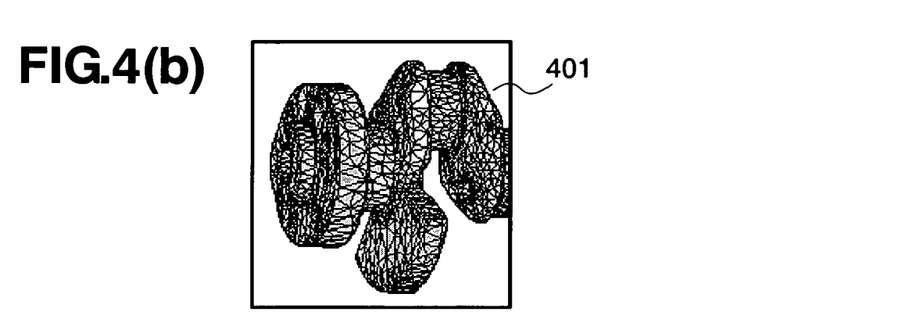

When the high-density triangle mesh data 301 is inputted, as is shown in FIG. 4(a), the mesh density lowering portion 106 treats the density lowering process upon that high-density triangle mesh data 301, to reduce the number of meshes thereof; thereby, generating a low-density triangle mesh data 401 (see FIG. 4(b); the low-density configuration mesh data in FIG. 2) (i.e., a mesh density lowering process 202). Herein, it is assumed that the number of meshes of the low-density triangle mesh data 401 is ten million (10,000,000) facets. The details of the process of lowering the number of meshes will be explained later.

When the mesh density lowering process is completed on the configuration mesh data 301, then the configuration mesh data input portion 105 reads the second high-density triangle mesh data 302 (the high-density configuration mesh data C in FIG. 2), neighboring to the high-density triangle mesh data 301, from the configuration mesh data storage portion 102a therein (i.e., a neighboring configuration mesh data input process 203).

When the high-density triangle mesh data 302 is inputted, the relative positions of both configuration data are set up by the mesh combining position setup portion 107, for the purpose of combining or connecting the low-density triangle mesh data 401 and the high-density mesh data 302 (i.e., a connecting position setup process 204). In more details thereof, the mesh combining position setup portion 107 determines the relative position of the low-density triangle mesh data 401 and the high-density mesh data 302, and it changes the coordinate values of an apex of the mesh upon basis of that relative position. Herein, in the example shown in FIG. 3, the positional relationship among the three (3) high-density triangle mesh data is same to the combining condition thereof; however, it is not always so, in many cases, and therefore, the present process is necessary in such the case, where the triangle mesh data does not fit to one another in the respective relative positions thereof.

Figure 4C:
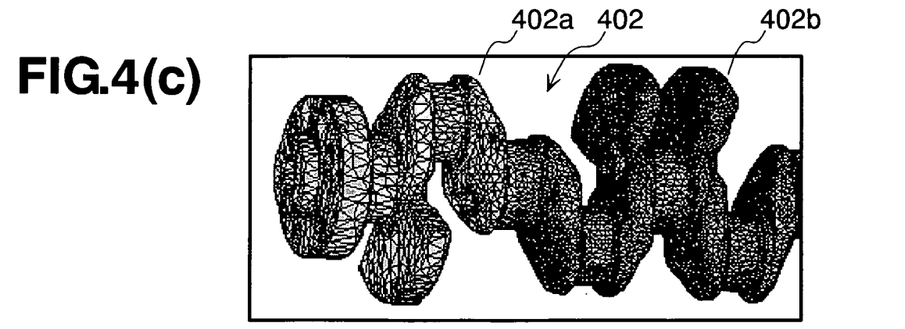

When completing the combining position setup process, the mesh combining portion 108 conducts a mesh combing process for connecting or combining the high-density mesh data 302 with the low-density triangle mesh data 401 (i.e., a mesh connecting process 205). With this, there can be obtained mixed and combined triangle mesh data 402, which mixes up the low-density portion 402a and the high-density portion 402b therein (see FIG. 4(c); a connection mixing configuration mesh data D in FIG. 2). The details of the mesh combining process will be explained later.

Figure 4D:
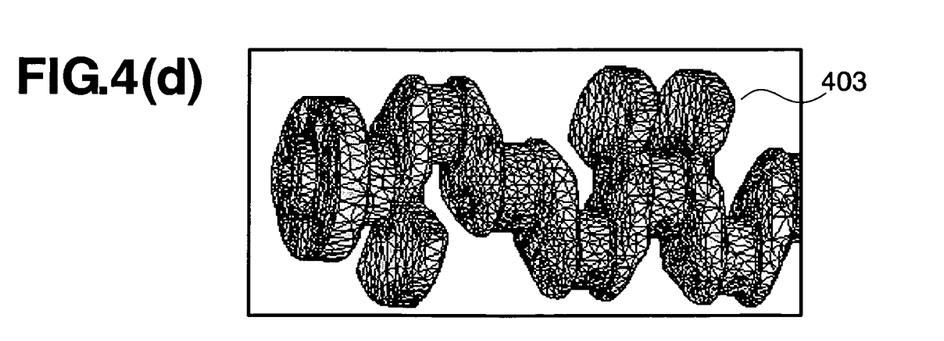

When obtaining the mixed and combined triangle mesh data 402, then the mesh density lowering portion 106 treats a density lowering process for reducing the number of meshes of the high-density portion on that mixed and combined triangle mesh data 402, and it generates the combined low-density triangle mesh data 403 (see FIG. 4(d); the number of meshes is twenty million (20,000,000) facets; a combined low-density configuration mesh data E in FIG. 2) (i.e., a mesh density lowering process 206, for the connection mixing triangle mesh data).

Figure 5A:
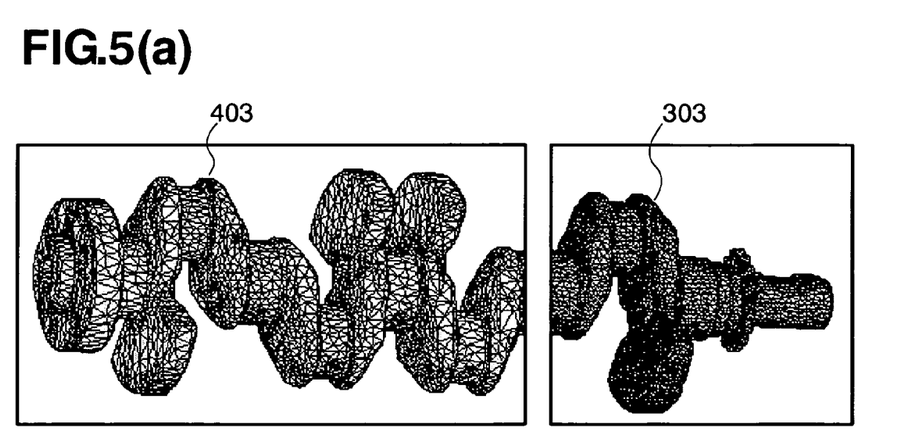
FIGS. 5(a) to 5(c) are views for showing further advanced conditions of advancements in lowering the density and also in combining the configuration data.
Figure 5B:
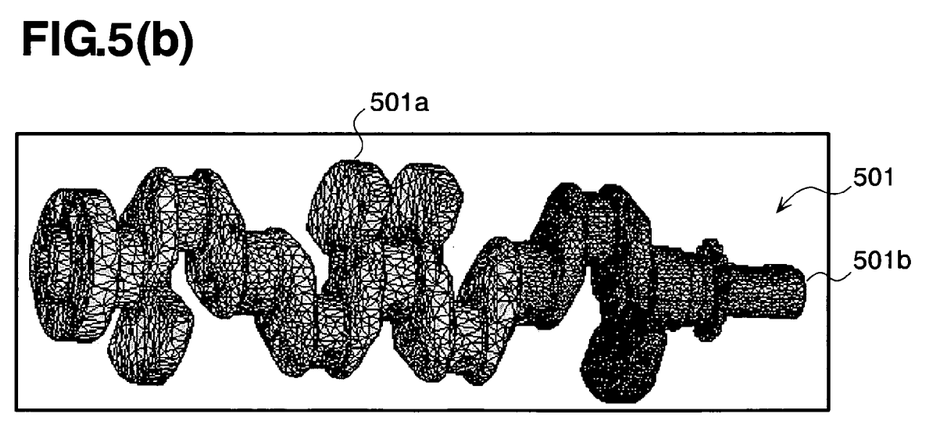
Figure 5C:
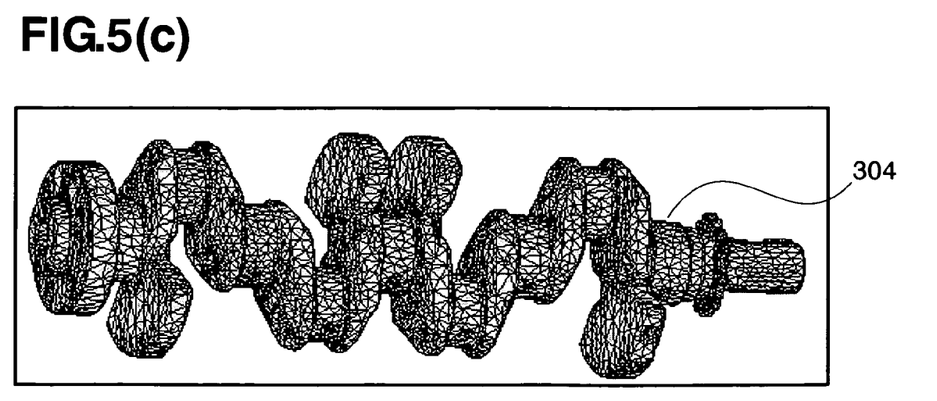

When completing the mesh density lowering process for the mixed and combined triangle mesh data, then determination is made on whether the configuration data is still remained or not, with respect to the said analysis target (i.e., a remaining configuration data determining process 207). In case where the configuration mesh data is still remained therein, then the step turns back to the neighboring configuration mesh data input process 203, and repeats those processes up to the remaining configuration data determining process 207, until when no configuration mesh data is remained therein. On the other hand, when it is determined that no configuration data is remained therein within the remaining configuration data determining process 207, then the step advances into a mesh generating process 208 for numerical simulation. In the present embodiment, there is remained the high-density triangle mesh data 303, and as is shown in FIG. 5, those processes are repeated, starting from the neighboring configuration mesh data input process 203 up to the remaining configuration data determining process 207. And, after passing through mixed and combined triangle mesh data 501 (see FIG. 5(b)) mixing a low-density portion 501a and a high-density portion therein, finally the combined low-density configuration mesh data 304 can be obtained (see FIG. 5(c)).

In the mesh generating process 208 for numerical simulation, the mesh data for numerical simulation is generated by means of the numerical simulation mesh generating portion 109; in more details thereof, the tetrahedron mesh data, from the final combined low-density configuration mesh data 304. When generating the tetrahedron mesh data, it is possible to apply the Deloni's dividing method or the advancing front method therein, for example. In case where the combined low-density configuration mesh data 304 is divided into plural numbers of areas or regions within an interior of the configuration thereof, each of the regions is divided into the tetrahedron meshes, one by one, through the Deloni's dividing method or the like, for example.

When completing generation of the mesh data for numerical simulation, then that mesh data for numerical simulation is stored into the simulation-use mesh data storage portion 102b, through the mesh data output portion 110, and thereby completing the processes.

With such the processes as was mentioned above, since the mesh data for numerical simulation is generated from the combined low-density mesh data, while generating the combined low-density mesh data through repeating the lowering of density and combination thereof, alternately, upon the plural numbers of high-density mesh data on one (1) piece of the analysis target; therefore, it is possible to suppress the data volume to be deal with the data processing apparatus during a series of the processes, to be equal or less that a constant value. In the example mentioned above, although the time point when the number of meshes increases at the most during the series of those processes is that when generating the mixed and combined triangle mesh data 501; however, the number of meshes exceeds 10,200,000 facets, a little bit, in the degrees thereof, but it never exceeds 11,000,000 facets, i.e., the processing capacity of the computer. Thus, even when generating the mesh data for numerical simulation from the plural numbers of the high-density triangle mesh data 301 to 303, coming up to 30,000,000 facets in total, it is possible to advance or procede the processes by means of the computer having the processing capacity of 11,000,000 facets, easily with a surplus, and also to shorten the processing time, with an increase of efficiency of mesh data generating process for numerical simulation. Also, since combination of each the configuration mesh data is conducted through combining the high-density configuration mesh data before lowering the density thereof with the low-density configuration mesh data, therefore it is possible to maintain the configuration accuracy at the connecting portions to be high in the configuration accuracy on the high-density configuration mesh data, and it is also possible to prevent the quality of meshes at the connecting portions from being degraded or lowered down.

Figure 6:
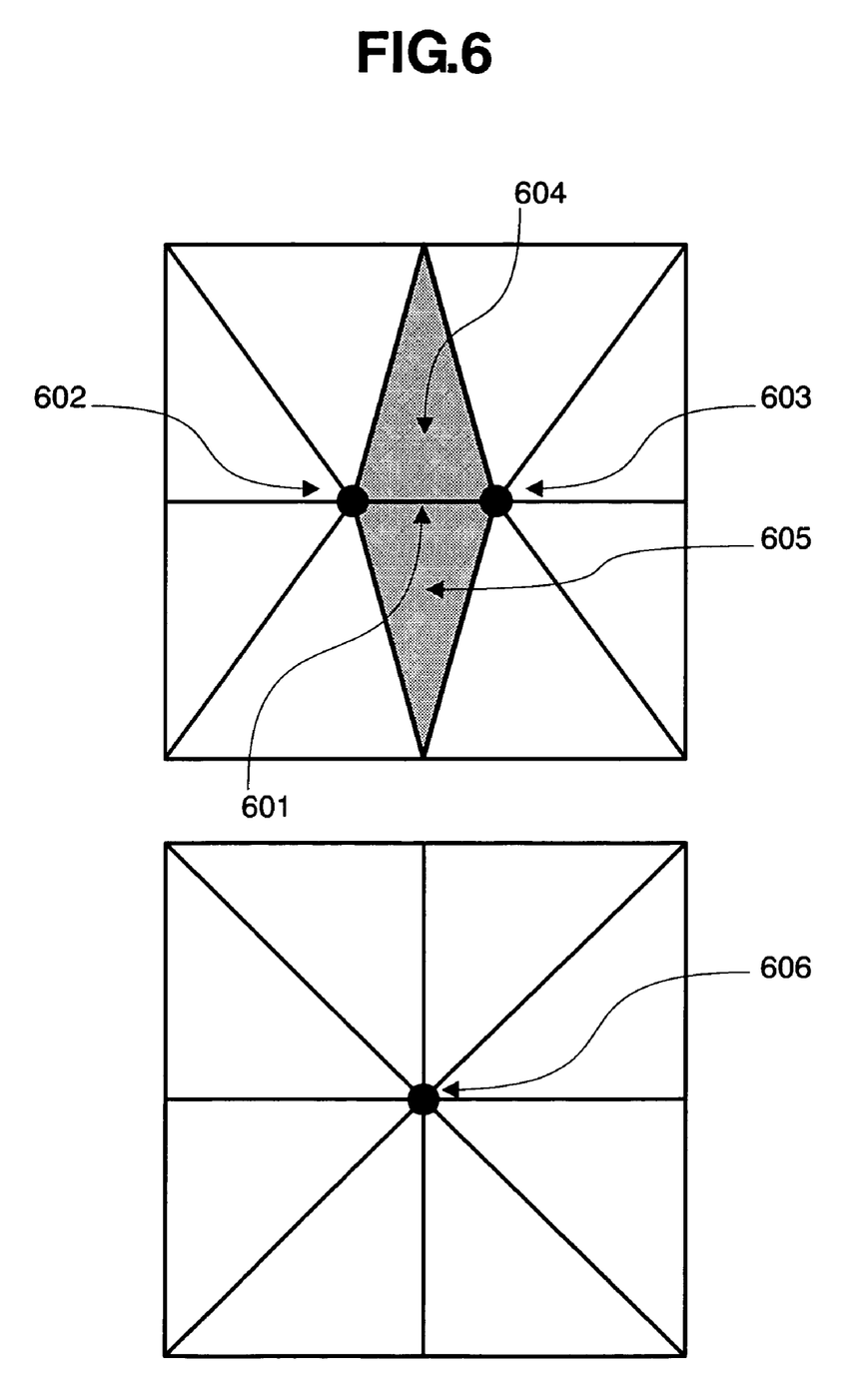
FIG. 6 is a view for showing the contents of an edge collapsing process, schematically.

Next, explanation will be made about the mesh density lowering process. The mesh density lowering process is conducted by reducing the number of meshes through repetition of the edge collapse process. FIG. 6 shows the contents of the edge collapsing process, schematically. What is shown in an upper stage of FIG. 6 is a triangle mesh data, and it is constructed with ten (10) pieces of triangles. On the other hand, what is shown in a lower stage of FIG. 6 is the triangle mesh data after the reduction, and it is constructed with eight (8) pieces of triangles, i.e., being reduced by two (2) pieces of the triangles therefrom. This edge collapsinge process is a method of reducing the number of meshes, by removing two (2) pieces of triangles 604 and 605 sharing a side 601 with each other, when paying an attention onto the side 601 of the triangle, for example, through replacing both end points 602 and 603 thereof with one (1) piece of an apex 606. Basically, the position of the apex 606 is determined at the gravity center of a group of triangles, each of which has the apexes at the points 602 and 603. Herein, an important aspect is that, if the quality is not good of the triangle meshes after reducing the number of meshes therefrom, then an ill influence is affected on the quality of the tetrahedron meshes when generating the tetrahedron mesh data for numerical simulation. Accordingly, it is preferable that the process of reducing the mesh number of the triangle meshes be executed under the following criteria or standard of mesh quality (i.e., quality threshold value).

Mesh size; the edge collapsing is executed upon the maximum mesh size that the user sets up, when none of the maximum side lengths of the triangles exceeds the maximum mesh size, which are to be converted in the shapes thereof through the edge collapsing.

Stretch (a ratio between a diameter of an inscribed circle within the triangle and the maximum side length thereof); the edge collapsing is executed upon the minimum stretch size that the user sets up, when all of the stretches the triangles exceeds the minimum stretch, which are to be converted in the shapes thereof through the edge collapsing.

Tolerance (error); the edge collapsing is executed upon the maximum tolerance that the user sets up, when distance does not exceed the maximum tolerance, from the apex, which is newly produced through the edge collapsing, to the configuration before the edge collapsing.

Figure 7:
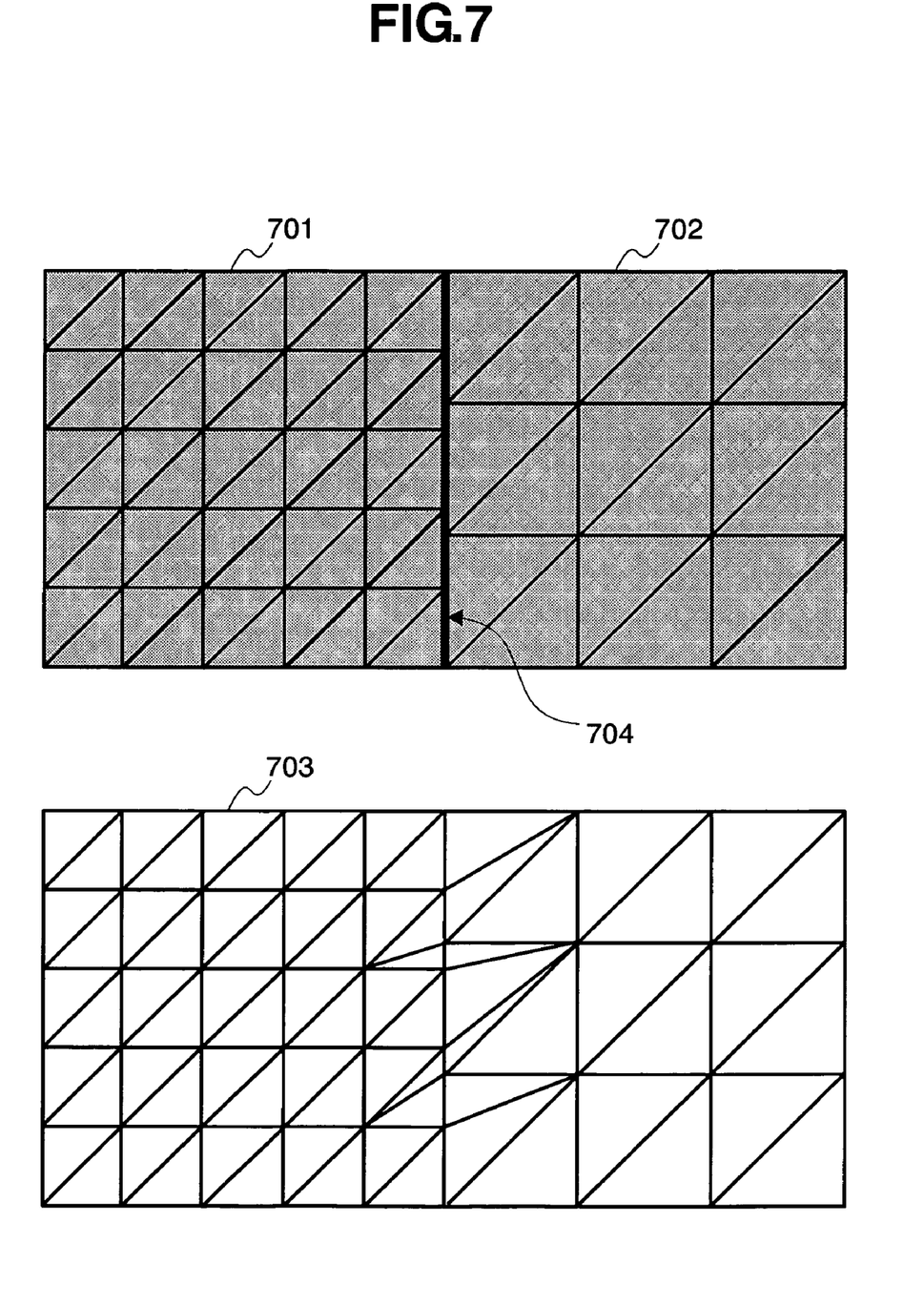
FIG. 7 is a view for showing an example of generating mixed and combined triangle mesh data, combining on a ridgeline from high-density triangle mesh data and the low-density triangle mesh data, schematically.

Next, explanation will be made about a method of combining the meshes. The mesh combining method is conducted by generating common meshes, through dividing the triangle mesh finely; so that the ridgelines and the apexes of both triangles are coincident with each other, in the common portion of the triangle mesh data. What is shown in FIG. 7 is an example of generating the mixed and combined triangle mesh data 703 from the high-density triangle mesh data 701 and the low-density triangle mesh data 702. The common portion (or the commonly shared portion) between the triangle mesh data 701 and the triangle mesh data 702 is the ridgeline 704, and the common meshes are generated through dividing the triangles, being in contact with the ridgeline 704 in such a manner, that all of the apexes lying on the ridgeline 704 come to the apexes of both the triangle mesh data 701 and the triangle mesh data 702 (i.e., a common apex). In this instance, priority is taken for the configuration on the high-density triangle mesh data 701 embodying the high configuration accuracy. Thus, the common apex is obtained by giving priority onto the apex of the triangle mesh of the triangle mesh data 701 of high density. With such the combining method, the triangle meshes contacting on the ridgeline 704 come to be fine common meshes, but without degrading the mesh quality thereof; therefore, it is possible to maintain the mesh quality, and also to maintain the configuration accuracy, which the high-density triangle mesh data embodies, on the mixed and combined configuration mesh data, too. Herein, the fact that the low-density triangle mesh data 702 passes through the mesh-density lowering process upon the basis of the mesh quality standard mentioned above is also effective for preventing the mesh quality from being degraded at the combined portion.

Figure 8:
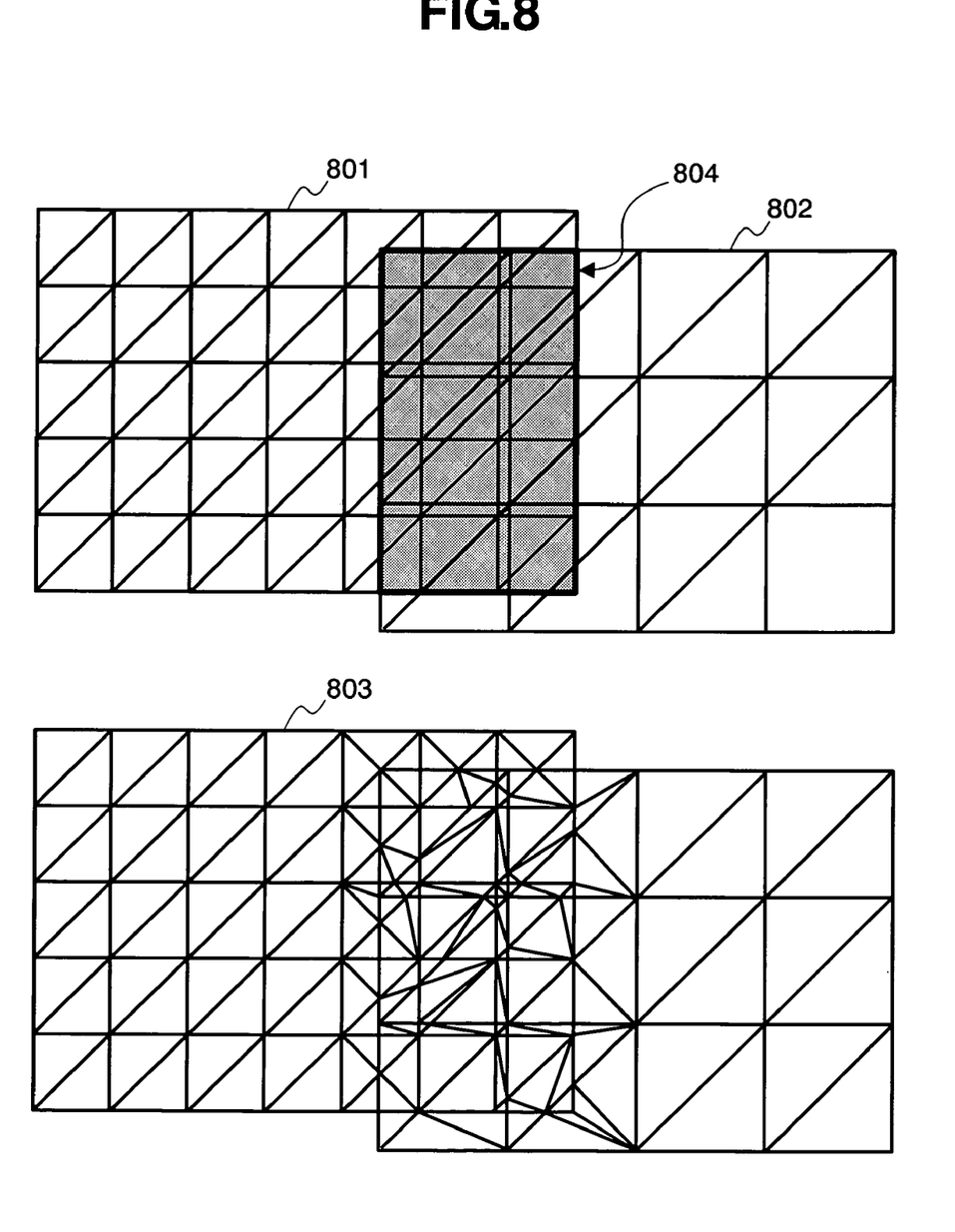
FIG. 8 is a view for showing an example of generating mixed and combined triangle mesh data, combining on a surface from the high-density triangle mesh data and the low-density triangle mesh data, schematically.

The example mentioned above is a case of combining on the ridgeline; however, there may be a case where the triangle mesh data are combined on a surface. An example of such the case will be shown in FIG. 8. In the example shown in the figure, the high-density triangle mesh data 801 and the low-density triangle mesh data 802 are combined with, on a common area or region 804, and thereby obtaining mixed and combined triangle mesh data 803. By dividing the triangle meshes, finely, while adding the apexes and intersecting points of the ridgelines of triangles within the common region 804 to both of the triangle mesh data, it is possible to generate the common triangle mesh data within the common region 804. In this case, it is also possible to maintain and improve the mesh quality, in the similar manner to the case where the meshes are combined on the ridgeline.

Figure 9:
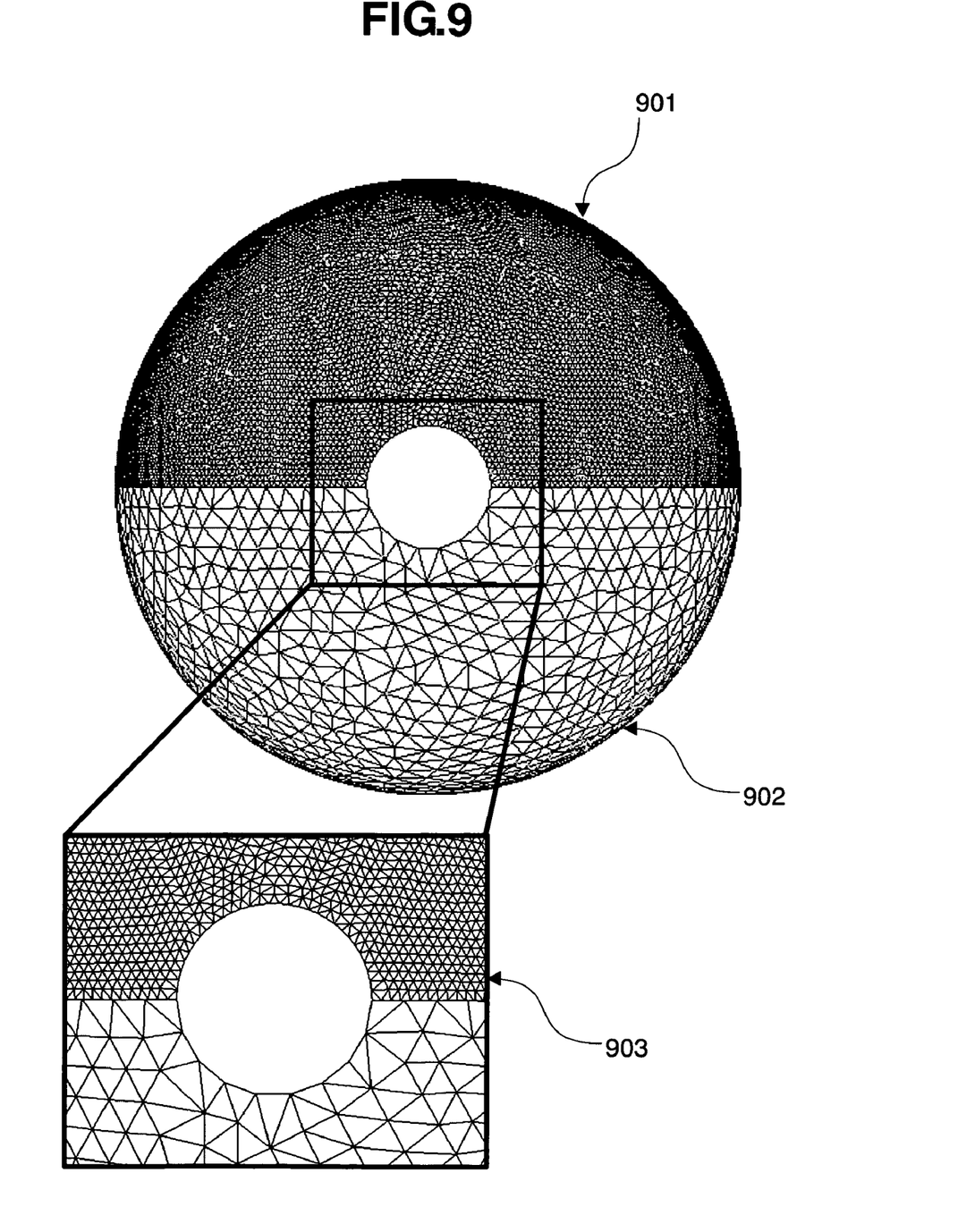
FIG. 9 is a view for showing a concrete example of condition, in particular, when completing the positioning for combining the high-density triangle mesh data and the low-density triangle mesh data.
Figure 10:
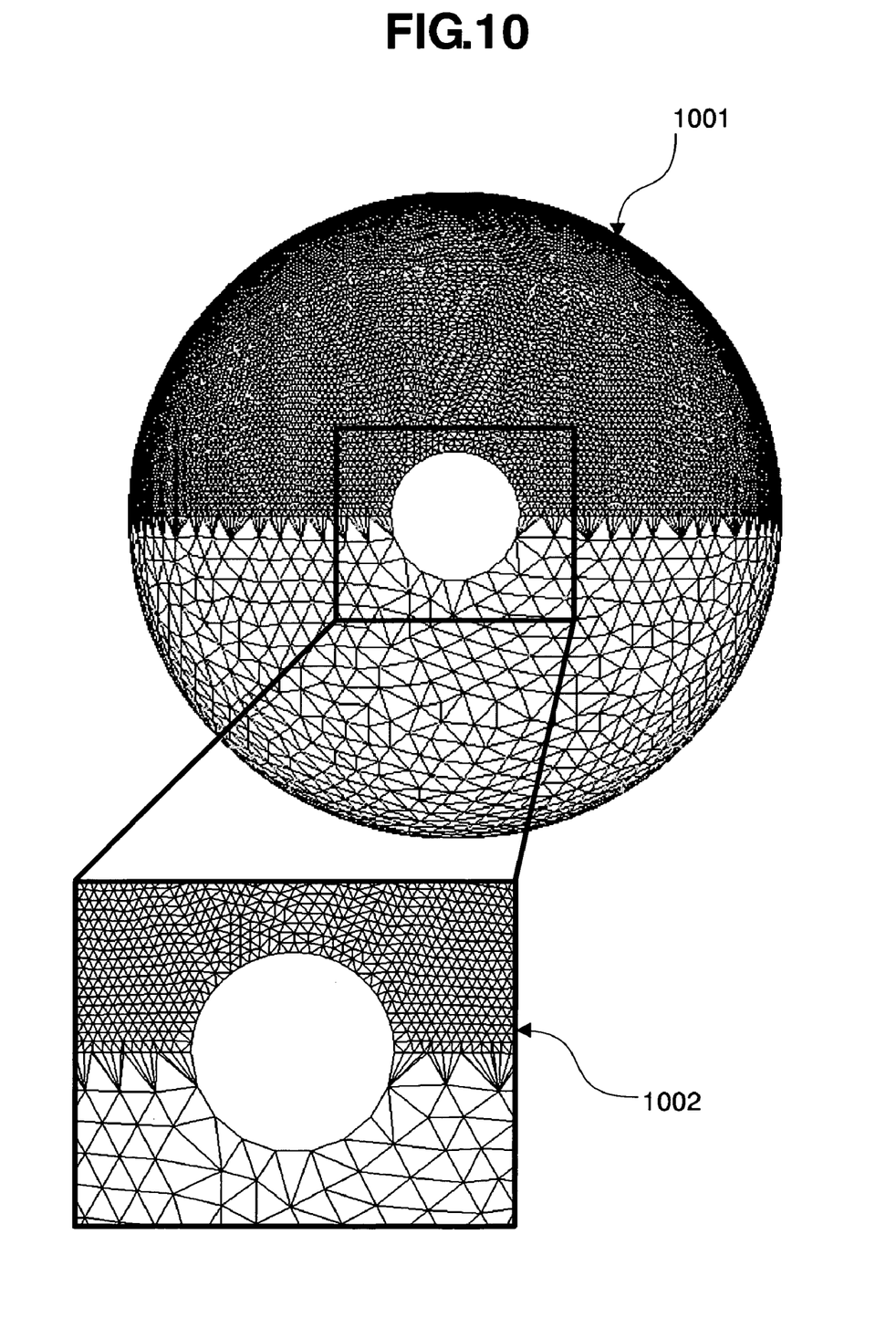
FIG. 10 is a view for showing an example of the mixed and combined triangle mesh data, after being conducted with a combining process between the high-density triangle mesh data of and the low-density triangle mesh data shown in FIG. 9.
Figure 11A:
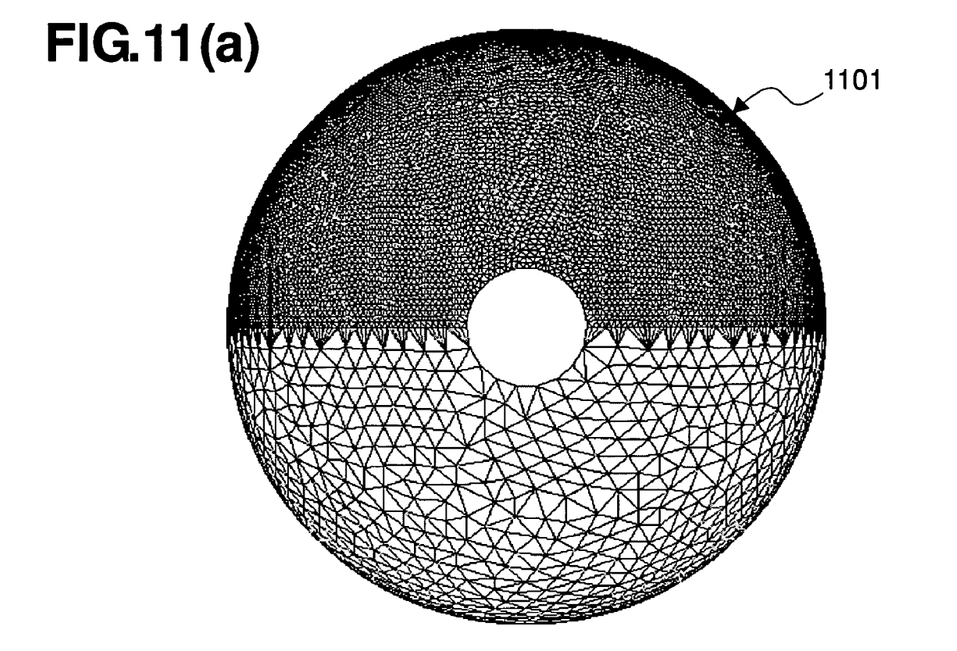
FIGS. 11(a) and 11(b) are views for showing a relationship, i.e., when a high-density portion on the mixed and combined triangle mesh data before lowering the density thereof comes to be combined low-density triangle mesh data through the process of lowering the density thereof.
Figure 11B:
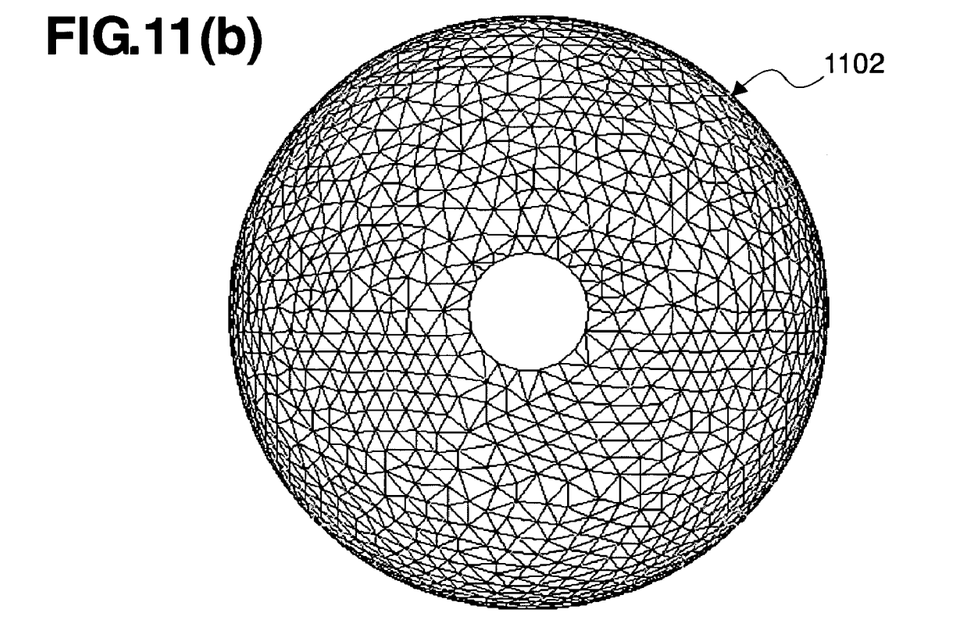

FIG. 9 to FIGS. 11(a) and 11(b) show the detailed examples of the mesh-density lowering process and the mesh combining process mentioned above. FIG. 9 shows conditions where the high-density triangle mesh data 901 and the low-density triangle mesh data 902 are positioned for combing them with each other. As is shown in an enlarged view 903 in the figure, the mesh is not shared with within the common portion. FIG. 10 shows the mixed and combined triangle mesh data 1001, after conducting the mesh combining process on the high-density triangle mesh data 901 and the low-density triangle mesh data 902 shown in FIG. 9. As is shown in an enlarged view 1002 in the figure, the triangle meshes are divided finely, so that the apexes and the ridgelines are commonly shared with. FIGS. 11(a) and 11(b) show relationship when the mixed triangle mesh data 1101 (see FIG. 11(a)), before lowering the density of the high-density portion in the mixed and combined triangle mesh data 1001 shown in FIG. 10, results into the combined low-density triangle mesh data 1102 (see FIG. 11(b)) through the density lowering process. From this example, it is possible to understand that an improvement is made on the mesh quality, in particular, in the vicinity of the mesh combining portions thereof.

Herein, where there are plural numbers of configuration mesh data for one (1) piece of the analysis target, there are sometimes cases where the boundary (i.e., the connecting line and/or the connecting surface) of the combining portion on each of the configuration mesh data should be kept with the mesh data for numerical simulation. In such cases, it is possible to keep the connecting lines and/or the connection surfaces of the mesh combining portion, by obtaining the position of the apex to be newly produced on the connecting line and/or the connection surface, relating to the edge collapsing of the ridgeline on the triangles lying on the connecting line and/or the connecting surface, when executing the density lowering process on the high-density portion of the mixed and combined configuration data.

As was mentioned above, the present invention enables to generate the mesh data for numerical simulation, even by means of the general-purpose computer, at high accuracy and in a short time period, in particular, in case where there are plural numbers of high-density configuration mesh data, each having a large data volume for one (1) piece of the analysis target, and when generating one (1) piece of the mesh data for numerical simulation from those plural numbers of the configuration mesh data, and therefore it can be applied, widely, for example, in a field of CAE, etc.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A mesh generating method for numerical simulation, generating mesh data for numerical simulation of one (1) piece of an analysis target, where there are plural numbers of high-density configuration data, each presenting a configuration surface thereof said one (1) piece of analysis target, comprising the following steps:

a step for reading one (1) piece of the configuration mesh data "A" from said plural numbers of the configuration mesh data;

a step for generating low-density configuration mesh data "B" through treating a density lowering process for reducing a number of meshes on said configuration mesh data "A";

a step for reading configuration mesh data "C" neighboring to said configuration mesh data "A" from said plural numbers of configuration mesh data;

a step for generating mixed and combined configuration mesh data "D" mixing a low density portion and a high density portion therein, through combining said low-density configuration mesh data "B" with said configuration mesh data "C"; and a step for generating combined low-density configuration mesh data "E" through treating said density lowering process for reducing a number of meshes on the high density portion of said mixed and combined configuration mesh data "D", wherein final combined low-density configuration mesh data is generated through repeating every said processes up to said process for generating the combined low-density configuration mesh data "E", until when none of said plural numbers of configuration mesh data remains, and mesh data for numerical simulation is generated from said final combined low-density configuration mesh data.

2. The mesh generating method for numerical simulation, as described in the claim 1, wherein said density lowering process is conducted under a predetermined standard of mesh quality.

3. The mesh generating method for numerical simulation, as described in the claim 1, wherein the combining of said configuration mesh data is conducted through generating common mesh at a common portion between said low-density configuration mesh data and said high-density configuration mesh data on targets to be combined.

4. The mesh generating method for numerical simulation, as described in the claim 3, wherein priority is given to the configuration of said high-density configuration mesh data when generating said common mesh data.

5. The mesh generating method for numerical simulation, as described in the claim 1, wherein said low-density configuration mesh data can maintain a connecting line or a connection surface therewith.

* * * * *